Patented Dec. 4, 1945

2,390,390

UNITED STATES PATENT OFFICE 2,390,390

HEAT DRYING PRINTING INKS AND VEHICLES THEREFOR

Charles A. Rietz, Park Ridge, and Francis J. Jeuck, Chicago, Ill., assignors to Interchemical Corporation, New York, N. Y., a corporation of Ohio No Drawing. Application July 21, 1942,
Serial No. 451,764

8 Claims. (Cl. 106—26)

This invention relates to printing inks which dry by evaporation of solvent in the vehicle. More particularly, the invention contemplates the provision of an improved printing ink vehicle which will set more effectively when heat is applied to the printed film, and which permits even greater speeds of printing and greater economy in the printing process.

Ordinary linseed oil inks dry by oxidation of the ink vehicle and consequently cannot be printed at the high speeds demanded today even when various driers are included in the ink. At present, such inks are primarily used in sheet-fed presses, and it is necessary to use slip sheets and/or offset-preventing powders to prevent the transfer of the freshly printed ink from one sheet to the next; and in some cases heat is used to accelerate the drying.

The problem of high speed printing on other than porous stock was solved with the introduction of the inks disclosed in A. E. Gessler Patent No. 2,087,190, dated July 13, 1937. These inks consist of pigment dispersed in a vehicle comprising binder dissolved in a solvent which is not volatile at normal room temperatures (about 70° F.), but which evaporates rapidly when heated to elevated temperatures (about 240° F.). Inks of this character are quickly and effectively dried by passing them through an oven which may be heated by means of open flames so that the solvent vapors will be burned. However, due to the amount of heat required to dry the solvent inks that are now available, the cost of heating is an important consideration in the ultimate cost of the printing process. Furthermore, there are many kinds of paper upon which the intense heat required for effective drying has an undesirable effect. In addition, attempts are constantly being made to increase the speed and decrease the cost of the printing process.

We have discovered a new and improved printing ink of the solvent type which permits increased speeds in the printing process at less cost than is possible with inks heretofore available. This new ink comprises pigment dispersed in a vehicle consisting of resin dissolved in a solvent which is substantially non-volatile at ordinary room temperatures (about 70° F.), but which evaporates rapidly when heated to elevated temperatures (of about 240° F.), said vehicle having a small percentage (from about 0.5 to 6%) of a thermoplastic film-forming agent insoluble in the said solvent and vehicle both at room temperatures and at elevated temperatures distributed in colloidal form throughout said vehicle.

The mechanism of the drying operation is obscure. The film-forming agent, being insoluble in the solvent or vehicle, has but little effect on the body of the ink either at room temperature or at elevated temperatures. However, in the drying ink film, the finely divided particles of the film-forming agent reduce the stickiness of the normally tacky film, apparently by action of the protruding insoluble particles as offset preventing media, and possibly by some surface phenomenon connected with the softening without melting of the particles of film-forming agent when exposed to the heat.

The thermoplastic film-forming agents used may be cellulose esters or cellulose ethers, or natural or synthetic resins, or prolamines such as zein; apparently any insoluble film-forming agent which softens but does not melt during the heating operation needed to set the ink may be used. Waxes, and the like, which melt under the heat of the driers, cannot be used effectively; and the results we obtain cannot be duplicated by the use of non-thermoplastic ingredients such as pigments, insoluble soaps, with "C" stage insolubilized heat-convertible resins, or other resins which do not soften on heating.

The effect described herein is also obtained where the film-forming agent is partially soluble either under printing conditions or under drying conditions, provided a small insoluble excess is maintained under drying conditions.

To obtain the desired colloidal distribution of the small percentage of film-forming agent, more than mere stirring, mixing, or grinding of the agent in powder form into the vehicle is desirable. We have found that the colloidal distribution can be obtained by heating the vehicle, with the film-forming agent added thereto, to a temperature above the melting point of the film-forming agent and maintaining the mixture at that temperature for a period sufficient to melt the film-forming agent. Then upon cooling of the vehicle to room temperature the film-forming agent separates out of the mixture to form the desired colloidal suspension. It is also possible to obtain the proper colloidal distribution by dissolving the film-forming agent in a solvent, adding the solution to the ink vehicle to obtain a uniform mixture, and then evaporating the solvent, preferably while grinding the ink, so that the film-forming agent separates out of the ink in colloidal form. A third method comprises malaxation of the insoluble film-forming ingredient with the resin, followed by cutting with the solvent.

Typical examples of printing ink vehicles embodying the principles of our invention and compounded in accordance with our preferred procedure are as follows:

*Example 1*

| | Parts by weight |
|---|---|
| Solvent (petroleum cut, having a distillation range of 5% at 497° F. and 95% at 527° F., having a dimethyl sulfate value of 3.0) | 1320 |
| F gum rosin | 1630 |

These are melted together in an open kettle at a temperature of 350° F., and after melting, add slowly, allowing time for reaction between additions:

| | |
|---|---|
| Lime | 106 |

When reaction is completed and foam is down, add:

| | |
|---|---|
| Ethyl cellulose (20 centipoise, medium ethoxy content) | 130 |

Close kettle and heat to 410° F., holding at that temperature for two hours. After cooling, add:

| | |
|---|---|
| Solvent (petroleum cut, having a distillation range of 5% at 497° F. and 95% at 527° F., having a dimethyl sulfate value of 3.0) | 900 |
| | 4086 |

In this limed rosin varnish, the film-forming agent is ethyl cellulose and constitutes about 3.2% of the total varnish, which is largely insoluble. This varnish has a mushy consistency due to the colloidal distribution of ethyl cellulose. However, one pass on a three-roller mill renders it free-flowing.

Inks made from this vehicle exhibit a pronounced improvement in drying over inks made without the ethyl cellulose. The insoluble portion of the ethyl cellulose remains substantially insoluble throughout the drying period, in which the ink film may reach almost 200–230° F.

If high ethoxy ethyl cellulose is used, much of it goes into solution during the drying period, causing bodying of the film; the residue acts to reduce stickiness.

*Example 2*

| | Parts by weight |
|---|---|
| Solvent (petroleum cut, having distillation range of 5% at 428° F. and 95% at 471° F., and having a dimethyl sulfate value of 4) | 1060 |
| F gum rosin | 1800 |

These are melted at 350° F. After melting, add as the reaction permits—

| | |
|---|---|
| Lime | 115 |

When reaction is completed, add—

| | |
|---|---|
| Ethyl cellulose (20 centipoise, medium ethoxy content) | 167 |

Close kettle and heat to 410° F., holding at that temperature for about 2 hours. After cooling, add—

| | |
|---|---|
| Solvent (petroleum cut, having distillation range of 5% at 428° F. and 95% at 471° F., and having a dimethyl sulfate value of 4) | 700 |
| | 3842 |

This gives results similar to those of Example 1.

*Example 3*

30 pounds terpene-phenol resin (Durez 220) and
50 pounds of the product obtained by malaxating—
  5 pounds alkyd resin, made by reacting 148 parts phthalic anhydride, 85 parts glycerine and 10 parts ethylene glycol to an acid number of about 55 to 60, and
  45 pounds of Durez 220
are added to
75 pounds of petroleum solvent of Example 2

The mixture is held at 160–200° F. for four hours, and then ground smooth on a three-roll mill.

It gives results, when made into an ink, essentially similar to those obtained with the vehicle of Example 1.

*Example 4*

30 pounds terpene phenolic resin of Example 3
15 pounds of a two-roller mill dispersion of 33⅓% ½ sec. Nitrocellulose and 66⅔% terpene phenolic resin
30 pounds petroleum solvent of Example 3

Hold at 160–200° F. for four hours, then grind on a three-roller mill.

In this vehicle, the nitrocellulose is substantially completely insoluble in the vehicle under all conditions.

*Example 5*

158 pounds varnish, formulated as follows:
  2100 parts gum rosin
  reacted with
  170 parts lime,
  and the limed rosin dissolved in
  1840 parts petroleum solvent of Example 3.
18 pounds varnish, formulated as follows:
  330 parts zein, dissolved in—
  1000 parts diethylene glycol Mix thoroughly, and give one run on three-roller mill.

In this vehicle, the zein is substantially completely precipitated in colloidal form in the vehicle, and remains substantially insoluble under printing and heat-drying conditions.

An example of an ink made with one of the vehicles described above is as follows:

*Example 6*

| | Parts by weight |
|---|---|
| Varnish of Example 1, or of the other examples | 1030 |
| Stearin pitch | 60 |
| Solvent (petroleum cut, having a distillation range of 5% at 497° F. and 95% at 527° F., and having a dimethyl sulfate value of 6) | 150 |
| Inert extenders | 70 |
| Carbon black | 520 |
| Prussian blue toner | 50 |

The above were mixed well on a four-roller mill,
and then—

| | |
|---|---|
| Varnish of Example 1 | 800 | were added and mixing completed.

2680

This produced a black ink which dried rapidly and without offset at web speeds of about 1200–1400 feet per minute.

As indicated in the examples, ethyl cellulose, nitrocellulose, alkyd resins and zein, have been found to be satisfactory film-forming agents for the practice of our invention. However, other cellulose derivatives, and other film-forming materials which are insoluble in the ink solvent and vehicle (such as polyvinyl chloride and similar resins), and may thus properly be distributed in colloidal form, may be used, provided they are thermoplastic, and do not melt completely at the drying heat (200 to 240° F.) employed.

We claim:

1. A vehicle useful in the preparation of printing inks adapted to be dried by heating films thereof to temperatures of the order of 200–240° F., comprising a solution of a resin in a solvent therefor, which is substantially non-volatile at 70° F., but which evaporates rapidly when the film is heated to the temperatures of the order of 200–240° F., the vehicle having distributed therethrough, in colloidal form, from 0.5 to 6% of a thermoplastic film-forming agent which remains insoluble in the resin solvent at both room temperature and at 200° F., and which will not melt completely on heating to the heat employed in drying, whereby the films are less sticky than similar films made without the added film-forming agent.

2. A vehicle useful in the preparation of printing inks adapted to be dried by heating films thereof to temperatures of the order of 200–240° F., comprising a solution of a resin in a solvent therefor, which is substantially non-volatile at 70° F., but which evaporates rapidly when the film is heated to the temperatures of the order of 200–240° F., the vehicle having distributed therethrough, in colloidal form, from 0.5 to 6% of ethyl cellulose which remains insoluble in the resin solvent at both room temperature and at 200° F., and which will not melt completely on heating to the heat employed in drying, whereby the films are less sticky than similar films made without the ethyl cellulose.

3. A vehicle useful in the preparation of printing inks adapted to be dried by heating films thereof to temperatures of the order of 200–240° F., comprising a solution of limed rosin in a solvent therefor, which is substantially non-volatile at 70° F., but which evaporates rapidly when the film is heated to the temperatures of the order of 200–240° F., the vehicle having distributed therethrough, in colloidal form, from 0.5 to 6% of ethyl cellulose which remains insoluble in the resin solvent at room temperature and at 200° F., and which will not melt completely on heating to the heat employed in drying, whereby the films are less sticky than similar films made without the ethyl cellulose.

4. A vehicle useful in the preparation of printing inks adapted to be dried by heating films thereof to temperatures of the order of 200–240° F., comprising a solution of a resin in a hydrocarbon liquid, which is substantially non-volatile at 70° F., but which evaporates rapidly when the film is heated to the temperatures of the order of 200–240° F., the vehicle having distributed therethrough, in colloidal form, from 0.5 to 6% of ethyl cellulose which remains insoluble in the resin solvent at both room temperature and at 200° F., and which will not melt completely on heating to the heat employed in drying, whereby the films are less sticky than similar films made without the ethyl cellulose.

5. A vehicle useful in the preparation of printing inks adapted to be dried by heating films thereof to temperatures of the order of 200–240° F., comprising a solution of limed rosin in a hydrocarbon liquid, which is substantially non-volatile at 70° F., but which evaporates rapidly when the film is heated to the temperatures of the order of 200–240° F., the vehicle having distributed therethrough, in colloidal form, from 0.5 to 6% of ethyl cellulose which remains insoluble in the resin solvent at both room temperature and at 200° F., and which will not melt completely on heating to the heat employed in drying, whereby the films are less sticky than similar films made without the ethyl cellulose.

6. A printing ink comprising pigment dispersed in the vehicle of claim 1.

7. A heat-drying printing ink comprising pigment dispersed in a vehicle comprising essentially a solution of limed rosin in a petroleum hydrocarbon liquid which is a non-solvent for ethyl cellulose, and is substantially non-volatile at 70° F., but rapidly volatile at 240° F., having colloidally dispersed therein from 0.5 to 6% of ethyl cellulose which will not melt completely on heating to the heat employed in drying, whereby the films are less sticky than similar films made without the ethyl cellulose.

8. The method of preparing a printing ink vehicle by colloidally dispersing ethyl cellulose in a solution of a resin in a petroleum hydrocarbon liquid which is substantially non-volatile at 70° F., but rapidly volatile at 240° F. in which the ethyl cellulose is insoluble, which comprises heating the ethyl cellulose with the resin and at least a portion of the solvent to a temperature sufficiently high to melt the ethyl cellulose, whereby solution is obtained, and then cooling the mixture whereby the ethyl cellulose amounting to 0.5 to 6% of the total vehicle by weight separates in colloidal form.

CHARLES A. RIETZ.
FRANCIS J. JEUCK.